12/29/81 XR 4,307,528

United States Patent [19]

Dewees et al.

[11] 4,307,528

[45] Dec. 29, 1981

[54] ROTATING DISPLAY

[75] Inventors: John G. Dewees, Morristown, N.J.; George N. Morgese, Huntington, N.Y.

[73] Assignee: Trans-World Manufacturing Corporation, Little Ferry, N.J.

[21] Appl. No.: 156,498

[22] Filed: Jun. 4, 1980

[51] Int. Cl.[3] ...................... G09F 13/00; A47F 11/06; G09F 13/16; G02B 5/32

[52] U.S. Cl. ............................... 40/433; 350/162 ZP; 350/162 R; 350/6.7; 362/811; 40/582; 40/427; 40/431

[58] Field of Search ................. 40/431, 430, 433, 219, 40/900, 560, 582, 583, 427, 434; 272/8 M; 362/806, 811, 350, 297, 343, 346, 348; 84/464 R; 350/162 R, 6.7; 428/42

[56] References Cited

U.S. PATENT DOCUMENTS

| | | | |
|---|---|---|---|
| 734,134 | 7/1903 | Porter | 350/162 R |
| 1,437,259 | 11/1922 | Mohr | 362/348 |
| 1,747,556 | 2/1930 | Price | 40/431 |
| 1,792,731 | 2/1931 | Craig | 40/433 |
| 1,918,123 | 7/1933 | Newman | 40/433 |
| 2,170,368 | 8/1939 | Gentilini | 40/433 |
| 2,211,749 | 8/1940 | Habin | 40/431 |
| 2,846,663 | 8/1958 | Heehler et al. | 362/297 |
| 2,853,918 | 9/1958 | Yoler | 36/6.7 |
| 3,215,022 | 11/1965 | Orgo | 84/464 |
| 3,366,786 | 1/1968 | Delano | 40/433 |
| 3,538,323 | 11/1970 | Ziegler | 362/806 |
| 3,614,193 | 10/1971 | Beiser | 350/162.28 |
| 3,700,880 | 10/1972 | Smith | 40/433 |
| 3,782,104 | 1/1974 | Kirsch | 40/434 |
| 3,800,451 | 4/1974 | Bulkley | 40/433 |
| 3,868,501 | 2/1975 | Barbour | 40/433 |
| 4,060,168 | 11/1977 | Romagnali | 428/42 |
| 4,164,823 | 8/1979 | Marsico | 40/219 |
| 4,250,537 | 2/1981 | Roegner et al. | 40/431 |

*Primary Examiner*—Gene Mancene
*Assistant Examiner*—Michael J. Foycik
*Attorney, Agent, or Firm*—Ostrolenk, Faber, Gerb & Soffen

[57] ABSTRACT

A rotating display which gives the illusion of simultaneous movement in both the clockwise and counterclockwise directions is disclosed. The rotary display inclues a rotary reflector having a plurality of light reflecting surfaces formed thereon. Each of the light reflecting surfaces is planar and lies in a plane different from each of the reflecting surfaces located adjacent thereto. Means for rotating the reflector about a predetermined axis is provided. A reflective diffraction grating surrounds the reflector and reflects light emitted from a light source onto the reflector and out towards the observer of the display.

14 Claims, 6 Drawing Figures

ROTATING DISPLAY

BACKGROUND OF THE INVENTION

The present invention is directed towards a rotating display, and more particularly, to a rotating display which gives the illusion of simultaneous movement in both the clockwise and counterclockwise directions.

The primary function of rotating displays is to present an aesthetically pleasing object which will catch the eye of a passing observer. Such displays are often used in connection with advertising, wherein a message to be conveyed is associated with the display. Such a message will normally concern the sale of a product, a service, or the like. Rotating displays have proved to be especially useful in this connection since the movement of the displays effectively catches the eye of the observer.

BRIEF DESCRIPTION OF THE INVENTION

The rotary display of the present invention includes:

a rotary reflector having a plurality of light reflecting surfaces formed thereon, each of the surfaces being planar and lying in a different plane from each of the reflecting surfaces located adjacent thereto;

means for rotating the rotary reflector about a predetermined axis, a reflective diffraction grating surrounding the rotary reflector; and a light source located at a position which will cause light emitting from the light source to reflect off the diffraction grating onto the reflective surfaces of the rotary reflector and out towards the viewer of the display.

In accordance with the preferred embodiment of the present invention, the diffraction grating is disposed coaxially with the rotary reflector and is adapted to diffract light reflecting off its surface into substantially all of the colors of the visible spectrum. The spectral light reflecting off the diffraction grating impinges on the rotary reflector is transmitted as a burst of colors to the viewer of the display. This provides a highly aesthetic appearance to the observer and draws the eye to the display.

An unexpected result of the present invention involves the orientation of the planar surfaces of the rotary reflector. Since each reflecting surface is planar and lies in a plane which forms an angle with respect to the plane of the reflecting surfaces located adjacent thereto, the spectral colors reflected off the rotary reflector appear to jump from one light reflective surface to the next at a speed which is greater than the rotational speed of the reflector and in a direction which is opposite the direction of rotation of the reflector. As a result, if the rotary reflector is rotated in a clockwise direction, the light appears to jump from one reflective surface to the next in a counterclockwise direction giving the illusion that the rotary reflector and the spectral light are rotating in opposite directions. This complex movement is highly striking and quickly catches the eye of the observer. This significantly enhances the message conveying ability of the display.

BRIEF DESCRIPTION OF THE DRAWINGS

For the purpose of illustrating the invention, there are shown in the drawings an embodiment which is presently preferred; it being understood, however, that this invention is not limited to the precise arrangements and instrumentalities shown.

DETAILED DESCRIPTION OF THE PREFERRED EMBODIMENT

Figure 1:
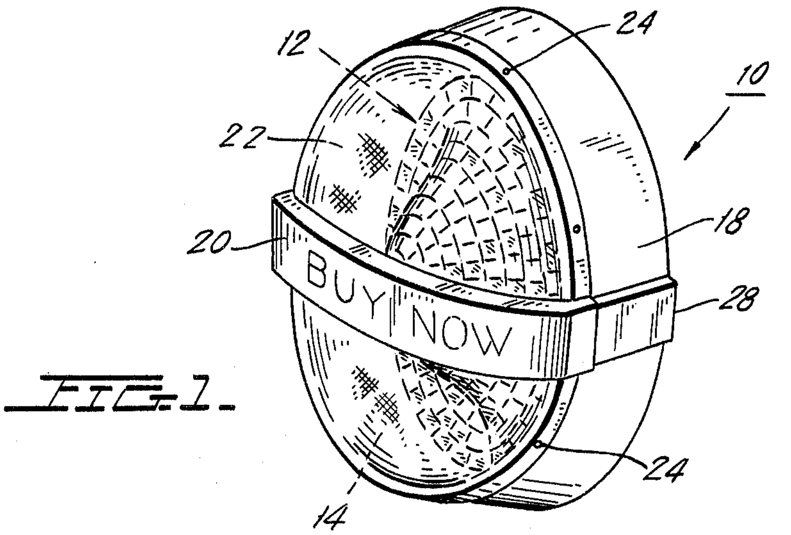
FIG. 1 is a perspective view of a rotary display formed in accordance with the principles of the present invention.
Figure 2:
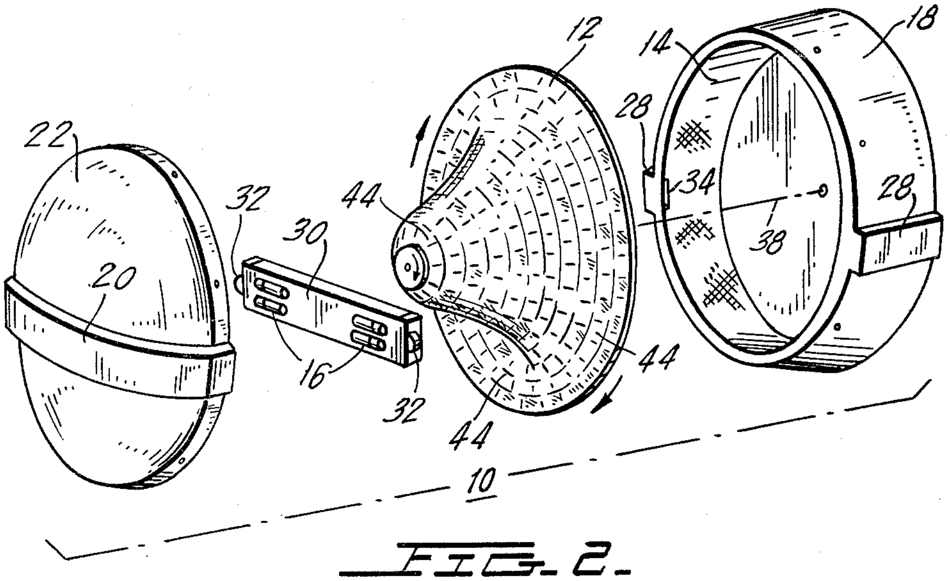
FIG. 2 is an exploded view of the rotary display of FIG. 1.

Referring now to the drawings, wherein like numerals indicate like elements, there is shown in FIGS. 1 and 2 a rotary display constructed in accordance with the principles of the present invention and designated generally as 10.

Figure 3:
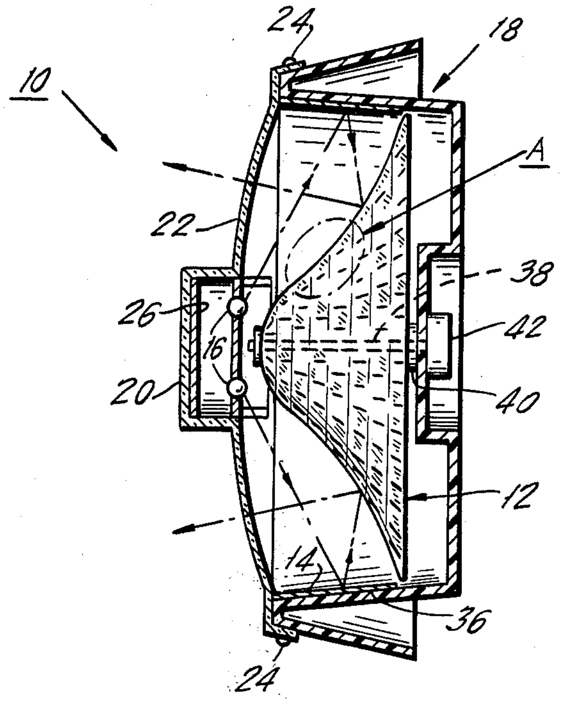
FIG. 3 is a side view, partially in cross-section, of the rotary display of FIG. 1.

The primary components of display 10 are a rotary reflector 12, a diffraction grating 14, and a plurality of light sources (preferably small incandescent bulbs) 16. These elements are supported by a generally cylindrical housing 18 which may be formed of molded plastic or other suitable material. In the preferred embodiment, rotary display 10 includes a message bearing surface 20 which contains a message to be conveyed to the observer of the display. In the embodiment illustrated in the drawings, the message bearing surface 20 is formed integrally with a transparent cover 22 which is attached to the housing 18 by a plurality of screws 24. The message forming surface 20 is preferably formed as a projection of the cover 22 so as to stand out from the display. While the message may be formed directly on the outer surface of the cover 22, it is preferable to provide a separate banner 26 may be adhered to the inner surface of the message bearing surface 20 as best illustrated in FIG. 3. In such a case, the banner 26 will contain the message to be conveyed and can be viewed by the observer of the display since the cover 22 is formed of a transparent material. By using a banner of this type, it is possible to change the message being presented by merely removing one banner and replacing it with a new banner. If desired, the banner may extend beyond the message bearing surface 20 onto the projections 28 formed on either side of the housing 18 so as to provide additional information on the projections 28. This information can include a message to be conveyed or it can merely be decorative.

The light sources 16 are located in recesses formed in a support plate 30 which is located beneath the message bearing surface and is hidden thereby. A pair of tongues 32 extend from either side of support plate 30 and are received in corresponding recesses 34 located on either side of housing 16. The location of recesses 34 are chosen to properly orient the support plate 30 below the message bearing surface 20. Electrical wires (not shown) extend from the light sources 16 through the housing 18 to an appropriate power supply.

The diffraction grating 14 comprises a series of narrow slits or grooves which diffract light incident thereon so as to produce a wide spectrum of colors. Diffractive grating 14 is reflective such that light emitted by light sources 16 and impinging on diffraction grating 14 will be refracted by the slits or grooves and reflected onto the rotary reflector 12. In the preferred embodiment, diffraction grating 14 is formed from a sheet-like material which is adhered to the inner surface 36 of housing 18. One such diffraction grating is commercially available under and may be purchased from the Diffraction Grating Co. of Maryland. As best shown in FIGS. 1 and 3, the inner surface 36 of housing 18 is formed in the shape of a truncated cone whose apex extends in a direction away from the observer of the display. Since the diffraction grating 14 is adhered to the inner surface 36 of housing 18, diffraction grating 14 also takes the form of a truncated cone which is coaxial with both housing 18 and reflector 12.

As best shown in FIG. 3, reflector 12 is also preferably formed in the general shape of a truncated cone but has curved side surfaces. Reflector 12 is mounted for rotation with a shaft 38 which is coaxial with the cone defined by diffraction grating 14. Shaft 38 is rotatably mounted to the bottom of housing 18 by an appropriate bearing 40. The end of shaft 38 located adjacent the bottom of housing 18 is coupled to an electric motor 42 which rotates shaft 38, and with it reflector 12, in a clockwise direction as illustrated in FIG. 2. If desired, motor 42 can be adaped to rotate reflector 12 in a counterclockwise direction.

Figure 6:
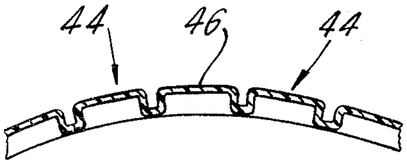
FIGS. 5 and 6 are cross-sectional views taken along lines 5—5 and 6—6, respectively, of FIG. 4.
Figure 4:
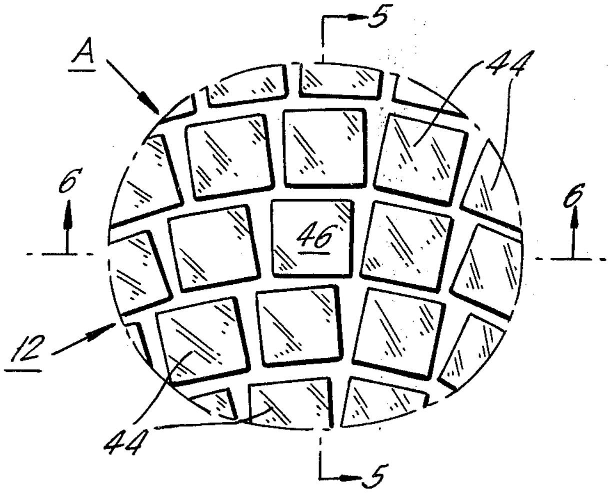
FIG. 4 is a plan view of the detail of area A of FIG. 3.
Figure 5:
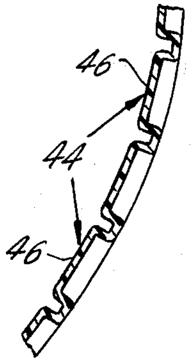

Rotary reflector 12 has a plurality of light reflecting surfaces 44 formed thereon. In a preferred embodiment, light reflecting surfaces 44 are formed symmetrically about the axis of rotation of reflector 12. As best illustrated in FIG. 4, each light reflecting surface 44 is preferably formed in the shape of a square and is spaced from the light reflecting surfaces adjacent to it. In order to attain the illusion that the spectral light reflected off the diffraction grating rotates in a direction opposite to the direction of rotation of the reflector, the inventors have discovered that the light reflecting face 46 of each light reflecting surface 44 must be planar and must lie in a plane which is different from the plane in which the light reflecting surfaces adjacent thereto lie. This is best illustrated in FIGS. 5 and 6 of the drawings which are cross-sectional views taken along lines 5—5 and 6—6, respectively, of FIG. 4. As a result of this feature of the invention, light reflecting off the diffraction grating 14 appears to jump from one light reflecting surface 44, to the next, in a counterclockwise direction as the reflector 12 is rotated in the clockwise direction. It has been found that this illusion is not created if the reflecting surfaces 44 are not planar.

The preferred orientation of rotary reflector 12, diffraction grating 14 and light sources 16 is illustrated in FIG. 3. As shown therein, light generated by light sources 16 impinges upon diffraction grating 14 and is diffracted into a large spectrum of colors. The so diffracted light is reflected off the diffraction grating 14 onto the light reflecting surfaces 44 of rotating reflector 12 and then out towards the viewer of the display. While the illustrated orientation of the light sources, diffraction grating and rotary reflector is preferred, other orientation may be used as long as light emitting by the light source is reflected off the diffraction grating, onto the rotary reflector and out in the direction of the viewer of the display.

In the preferred embodiment, rotary reflector 12 is formed of plastic and is vacuum metalized to create a silver effect comparable to a mirror. If desired, each of the reflecting surfaces 44 may be formed of an individual glass mirror located on an appropriate substrate. In either case, the primary requirement of each light reflecting surface 44 is that it have a planar light reflecting face and that the planar light reflecting face form an angle with respect to the light reflecting faces adjacent thereto.

The present invention may be embodied in other specific forms without departing from the spirit or essential attributes thereof and, accordingly, reference should be made to the appended claims, rather than to the foregoing specification as indicating the scope of the invention.

What is claimed is:

1. A rotary display, comprising:

a rotary reflector having a plurality of light reflecting surfaces formed thereon, each of said surfaces being planar and lying in a different plane from each of the reflecting surfaces located adjacent thereto:

means for rotating said rotary reflector about a predetermined axis;

a reflective diffraction grating surrounding said rotary reflector; and a light source located at a position which will cause light emitting from said light source to reflect off of said diffraction grating as colored light and thereafter to impinge onto the reflecting surfaces of said rotary reflector whereby said display provides the illusion that when said reflector is rotating in a first direction, said colored light appears to rotate in a second opposite direction.

2. A rotary display according to claim 1, wherein said reflecting surfaces are symmetrically spaced about said axis.

3. A rotary display according to claim 2, wherein said rotary reflector is formed in the general shape of a cone having curved side surfaces.

4. A rotary display according to claims 1, 2 or 3, wherein each of said reflective surfaces has a square shape as viewed in its respective plane.

5. A rotary display according to claims 1, 2 or 3, wherein said diffraction grating is coaxial with said predetermined axis.

6. A rotary display according to claims 1, 2 or 3, wherein said diffraction grating breaks up the light emitted by said light source into substantially all the colors of the visible spectrum.

7. A rotary display according to claim 6, wherein said diffraction grating is formed in the general shape of a truncated cone and wherein the axis of said cone is coaxial with said axis about which said reflector rotates.

8. A rotary display according to claim 1, further including a message bearing surface formed on said display and bearing a message to be conveyed.

9. A rotary display according to claims 1, 2 or 3, wherein said rotary display further includes a housing supporting said rotary reflector, said rotating means and said reflective diffraction grating.

10. A rotary display according to claim 9, wherein said housing includes a transparent cover on the face thereof.

11. A rotary display according to claim 10, further including a message bearing surface formed in said cover, said message bearing surface bearing a message to be conveyed.

12. A rotary display according to claim 11, wherein said light source is located between said message bearing surface and said rotary display.

13. A rotary display according to claim 11, wherein said message is formed on a banner removably coupled to said message bearing surface.

14. A rotary display according to claim 9, wherein said light emitted by said light source, reflected off said diffraction grating and onto said reflecting surfaces of said rotary reflector is reflected off said rotary display and out of said housing through said transparent cover.

* * * * *